United States Patent [19]
Engel

[11] 4,289,583
[45] Sep. 15, 1981

[54] OIL RECLAMATION DEVICE

[76] Inventor: Gary C. Engel, 123 NW. 109th St., Miami Shores, Fla. 33168

[21] Appl. No.: 68,311

[22] Filed: Aug. 20, 1979

Related U.S. Application Data

[63] Continuation-in-part of Ser. No. 852,976, Nov. 18, 1977, Pat. No. 4,189,351.

[51] Int. Cl.³ .................. B01D 3/28; B01D 27/08; C10G 7/00
[52] U.S. Cl. .................. 196/115; 196/46.1; 196/128; 208/179; 210/180; 210/446
[58] Field of Search ............ 196/115, 121, 128, 46.1; 210/180, 184, 446, 285; 208/179; 202/178

[56] References Cited
U.S. PATENT DOCUMENTS

| | | | |
|---|---|---|---|
| 2,425,377 | 8/1947 | La Brecque | 196/119 X |
| 2,785,109 | 3/1957 | Schwalge | 210/285 X |
| 3,616,885 | 11/1971 | Priest | 208/179 |
| 3,756,412 | 9/1973 | Barrow | 210/184 X |
| 3,859,975 | 1/1975 | Hines | 208/179 X |
| 3,915,860 | 10/1975 | Priest | 208/179 X |
| 4,006,084 | 2/1977 | Priest | 208/179 X |
| 4,093,548 | 6/1978 | Sterkenburg et al. | 196/46.1 X |
| 4,115,201 | 9/1978 | Malec | 196/128 |

FOREIGN PATENT DOCUMENTS

| | | |
|---|---|---|
| 13849 | 3/1975 | Peru . |
| 1424625 | 2/1976 | United Kingdom . |

*Primary Examiner*—Frank W. Lutter
*Assistant Examiner*—Roger F. Phillips
*Attorney, Agent, or Firm*—Neil F. Markva

[57] ABSTRACT

An oil reclamation device comprises a housing, filter, evaporator plate and heating assembly. The housing has a longitudinal axis and includes an oil inlet to receive oil to be reclaimed and an oil outlet to discharge reconditioned oil. Features of this invention include an improved filter assembly, an inside sealing mechanism for flow control, a wall guide mechanism to maintain proper flow control, an improved heat transmitting element, an oil inlet metering assembly and an improved evaporator plate.

28 Claims, 19 Drawing Figures

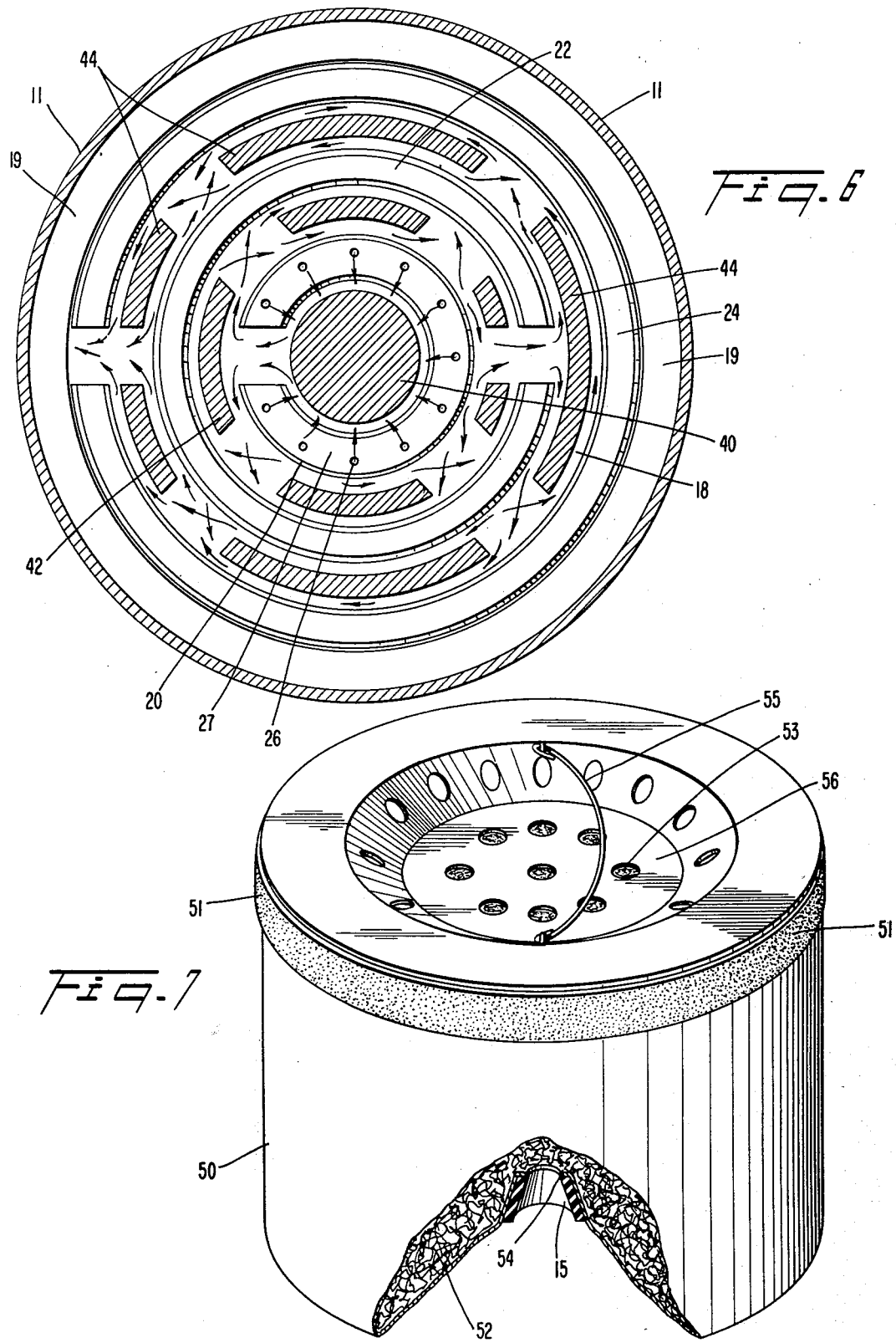

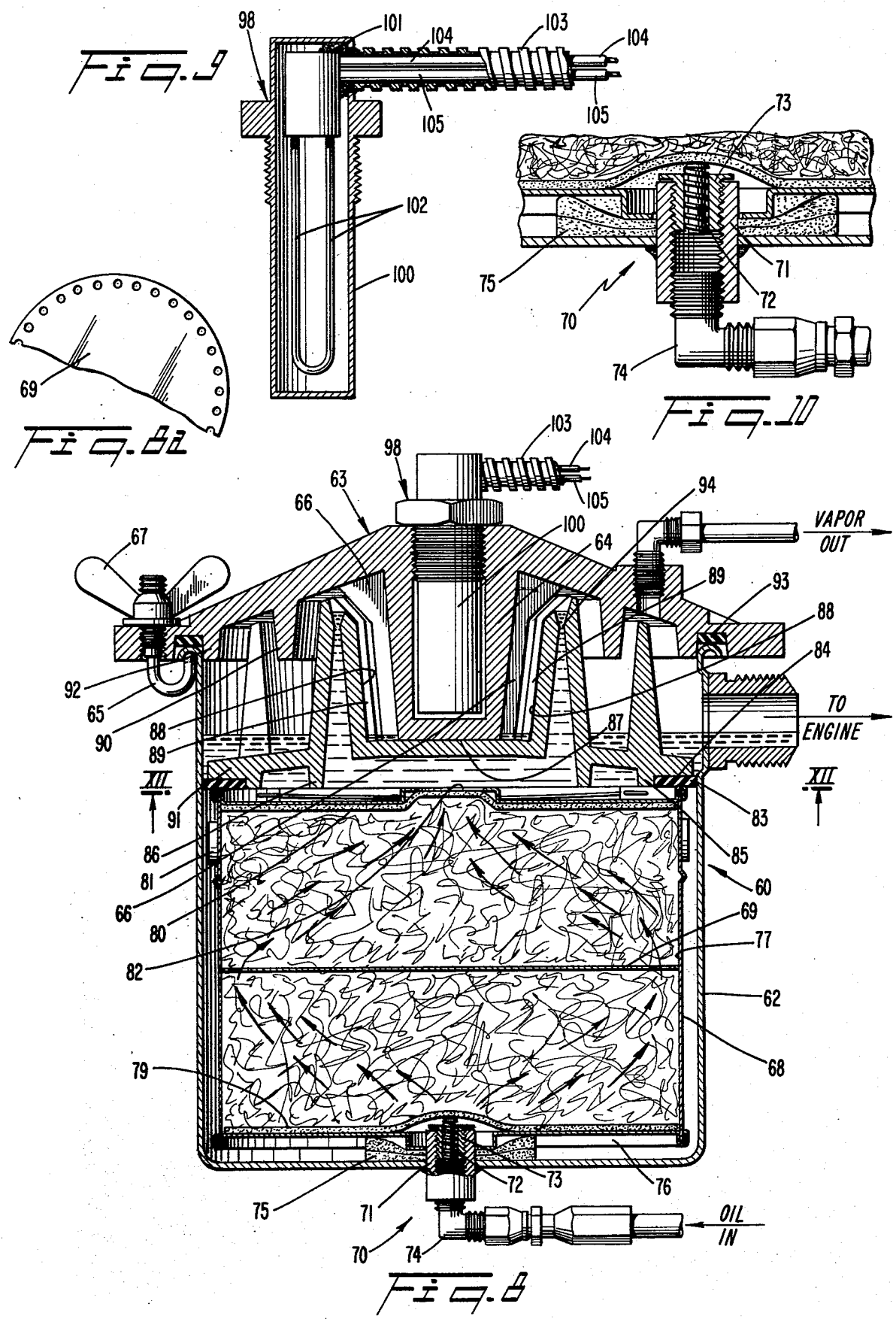

OIL RECLAMATION DEVICE

RELATED APPLICATION

This is a continuation-in-part application of United States Patent Application Ser. No. 852,976 filed Nov. 18, 1977, and now U.S. Pat. No. 4,189,351.

BACKGROUND OF THE INVENTION

This invention relates to oil reclamation devices which are used with engines using lubricating oils and hydraulic systems to remove solid contaminates and water or other volatile contaminates from the lubricating oils or hydraulic fluids. More particularly, the invention relates to a unique evaporation plate and cover assembly and an improved filter assembly.

Oil reclamation devices of the type disclosed and described herein are generally well known. These devices are used to remove both solid and liquid contaminates from the lubricating oil. It is well known that oil in and of itself does not "wear out". Once the solid and volatile contaminates are removed therefrom, the oil is substantially reconditioned and remains in a most useful state.

The following patents disclose the general state of the art: U.S. Pat. Nos. 2,839,196, 3,616,885, 3,915,860, 4,006,084, 4,115,201 and Peru Patent No. 13849 dated Feb. 28, 1975.

Numerous disadvantages are associated with these known devices. For example, oil passes directly between the outer periphery of the evaporator plates and the inside of the containers due to the manner in which the evaporator plate is secured therein. Thus, oil containing unvolitalized contaminates will pass directly out of the oil outlet means of the container because it will not be included in any thin film traveling over the vaporizing surface on the upper side of the evaporator plate.

It is extremely important that the oil passing across the vaporizing surface be maintained in as thin a film as possible. With the known devices, if the longitudinal axis is angularly disposed more than 5° from the vertical while installed, the oil will all flow to one side of the evaporator plate. Consequently, the effectiveness of the device will be virtually destroyed because of the depth of the oil from which the volatile contaminates can be volatilized.

None of the prior art devices are designed to effect the greatest efficiency of removing the contaminates and maintaining the operation of the device. Prior art metering jets frequently clog causing a shut-down. Positioning of the cover member is fixed with respect to the container. Pressure build-up within the container causes shifting of the filter medium during operation. Disposition of the heating element directly in the evaporation chamber increases the chances of explosion. Inefficient transfer of heat from the heating surface to the thin film of oil is encountered. Finally, the use of the known devices in marine conditions is questionable because of the open electrical connections.

PURPOSE OF THE INVENTION

The primary object of the invention is to provide a highly efficient and easily maintainable structure for an oil reclamation device having a filter assembly and an evaporation chamber for removing solid and liquid contaminates from lubricating oils.

Another object of the invention is to provide an evaporation chamber in an oil reclamation device which results in a significantly controlled flow of oil being treated.

A further object of the invention is to expose substantially all of the oil to substantially uniform mechanical filtration and evaporation treatment.

A still further object of the invention is to provide an evaporator plate and a heat transmitting member having interacting portions which contribute to establish a uniformity in heating and a uniformity with respect to the fluid flow through the evaporation chamber.

It is still a further object of this invention to provide a filter assembly which will obviate problems associated with the disposition of fibrous material as it is provided in prior art oil reclamation devices.

SUMMARY OF THE INVENTION

The oil reclamation device comprises a housing means having a container, a cover means, an oil inlet means and an oil outlet means. Filter means and evaporator plate means are disposed in the container and heating means is attached to the cover means. The evaporator plate means includes an upper and a lower side with the upper side having a vaporizing surface along which oil passes in a thin film. The lower side faces downwardly toward the filter means. The cover means includes a heat transmitting member and defines an evaporation chamber between the cover means and the evaporation plate means. Passageway means extend from the filter means through the evaporator plate means and open onto the upper side of the evaporator plate means to deliver oil into the evaporation chamber in a thin film along the vaporizing surface.

A first feature of the invention is directed to a system for effecting sealing between the evaporator plate means and the inside of the container to control the flow of substantially all of the oil through the center of the device. The lower side of the evaporator plate means includes an annularly disposed outer peripheral seat for receiving sealing means disposed between the evaporator plate means and the filter means. The sealing means is located along the entire periphery of the evaporator plate means to prohibit bypassing of the fluids between the plate means and the container. With this system fastening of the cover to the top of the container is effected externally of the device. A portion of the inside of the cover means is in contact with a portion of the upper side of the evaporator plate means to sealingly urge the evaporator plate means against the filter means with the sealing means therebetween. This configuration necessarily controls the flow of the oil to be treated in the evaporation chamber from the underside of the evaporator plate to the upper side thereof for introducing the oil along one edge of the vaporizing surface.

Another feature of the invention is directed to the use of wall guide means which control the flow across the vaporizing surface of any evaporator plate means. This includes a plurality of radially extending wall members disposed across the vaporizing surface to form subdivided sections therealong. The outwardly extending wall guide means maintain the direction of movement of the oil being treated along the vaporizing surface when the longitudinal axis of the device is angularly disposed with respect to the vertical. With this particular feature of the invention, the longitudinal axis may be angularly disposed up to 20° with respect to the vertical without adversely affecting the efficiency of the device. This feature of the invention is clearly applicable to some of the prior art devices thereby overcoming a serious problem associated therewith.

A further feature of the invention is directed to the oil inlet assembly which has a metering element to control the rate of oil flow into the container. The problem of the frequent clogging of metering jets is obviated through the use of a circumferential groove which enables the cross-section opening of the groove to be larger than in the straight bore openings of the prior art. It has been found that the use of the circumferential groove in the metering element will provide the same flow rate into the container with a cross-sectional opening that is substantially twice the size of the prior art metering jet. This enables the contaminated oil to flow through the system without clogging the metering jet of the present application.

Another feature of the invention is the use of J-bolts which may be placed in contact with the outwardly rolled peripheral edge at the top of the container. This enables the cover to be disposed at any desired displacement on the top of the peripheral edge of the container to be universally adaptable to the place in which the reclamation device is to be installed.

When there is pressure buildup within the container as the oil enters into the oil inlet means, the filter medium tends to rise upwardly against the bottom portion of the evaporator plate means. This potentially causes shifting of the elements within the container and could cause damage to the filter medium and ultimately stop the flow of material through the device. The evaporator plate of this invention includes a downward projection that is laterally displaced inwardly from the outer periphery of the evaporator plate means for the purpose of holding the filter medium in place as disposed around the oil inlet means of the container.

The heating element of the present invention is designed to fit into the cavity on the side of the heat transmitting member opposite the heating surface. A solid heat conducting particulate material is disposed in the cavity with the heating element. A further feature of the invention incorporates the use of an epoxy adhesive material to cement the electrical leads directly to the electrical resistance unit inside the heating element casing. The casing includes an opening through which the electrical leads extend. The same epoxy adhesive material is used to fix a flexible protective conduit in the opening and dispose the conduit around the electrical leads thereby providing a complete waterproofing of the system.

The prior art devices place the electrical resistance element directly in contact with the oil being heated for evaporation. In other embodiments, a simple shield is placed over the heating element located inside the evaporation chamber. In both of these instances, there is a significant danger of explosion. It is known to heat the inside of the evaporation chamber via an indirect method incorporating the use of a heat transmitting member. In these known devices, however, there has been discovered a need to increase the efficiency of heat transfer from the heating surface to the thin film of oil passing over the vaporizing surface. The present invention contemplates the use of a centerpost member having a plurality of fins outwardly directed toward a vaporizing surface which extends upwardly toward the inner surface of the cover means. The disposition of these fin members adjacent the vaporizing surface has been found to greatly enhance the efficiency of removing the volatile contaminates from the thin oil film passing downwardly over the vaporizing surface.

Finally, the filter assembly of the present application constitutes a significant improvement in control of the flow of oil through an oil impervious canister means. A baffle member is disposed intermediate the two ends of the canister to cause the oil to necessarily pass from the inlet means outwardly to the periphery of the baffle member disposed within the filter medium. The oil then must necessarily flow back to the center of the canister and out of the opening located in the upper end portion. The specific disposition of compressed cotton fiber filter medium and filter pads between the filter medium and the inside surface of the end portions greatly benefit the filtering function of the device.

BRIEF DESCRIPTION OF DRAWINGS

Other objects of this invention will appear in the following description and appended claims, reference being made to the accompanying drawings forming a part of the specification wherein like reference characters designate corresponding parts in the several views.

FIG. 6 is a sectional view taken along line VI—VI of FIG. 3; and

FIG. 7 is a perspective view of a filter assembly partially in section showing another feature of the invention.

FIG. 8 is a sectional view of another embodiment of a device made in accordance with this invention along line VIII—VIII of FIG. 14;

FIG. 8a is a fragmentary plan view of a baffle means made in accordance with this invention;

FIG. 9 is a sectional view of a heating element made in accordance with this invention;

FIG. 10 is a detailed cross-sectional view of the oil inlet assembly made in accordance with this invention;

DESCRIPTION OF SPECIFIC EMBODIMENTS

Figure 1:
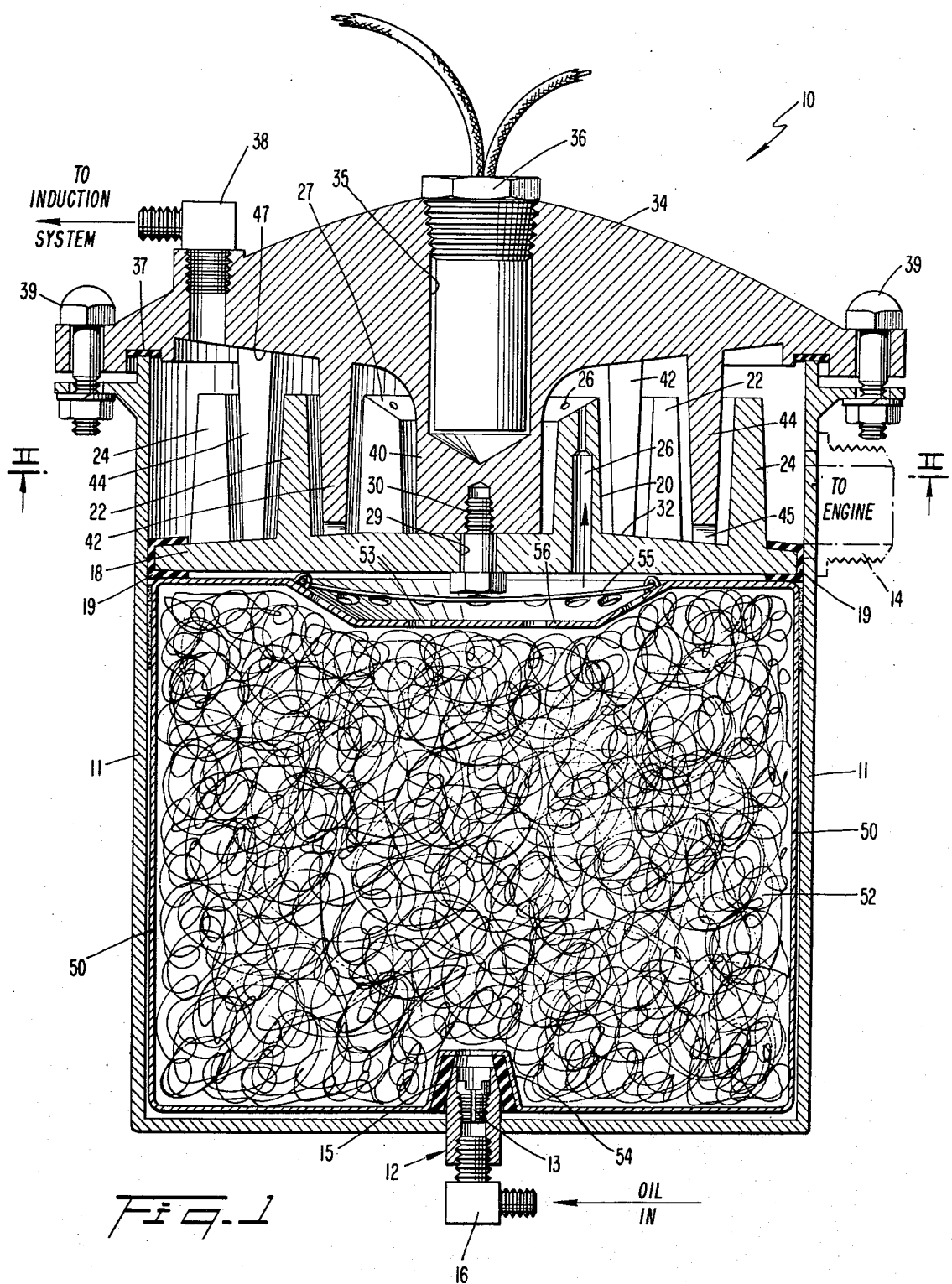
FIG. 1 is a sectional view along line I—I of FIG. 2 through the longitudinal axis of a reclamation device made in accordance with this invention.
Figure 2:
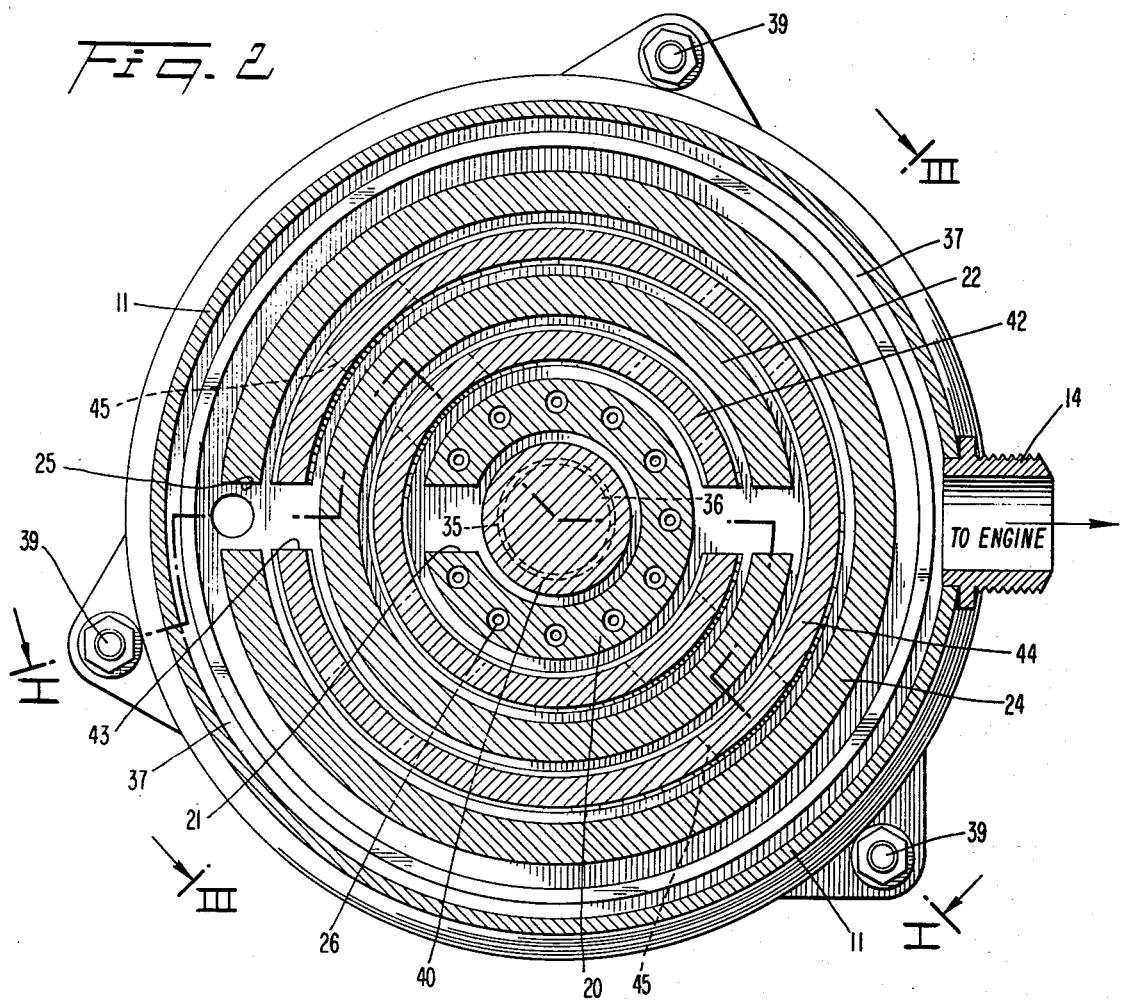
FIG. 2 is a sectional view along line II—II of FIG. 1.
Figure 3:
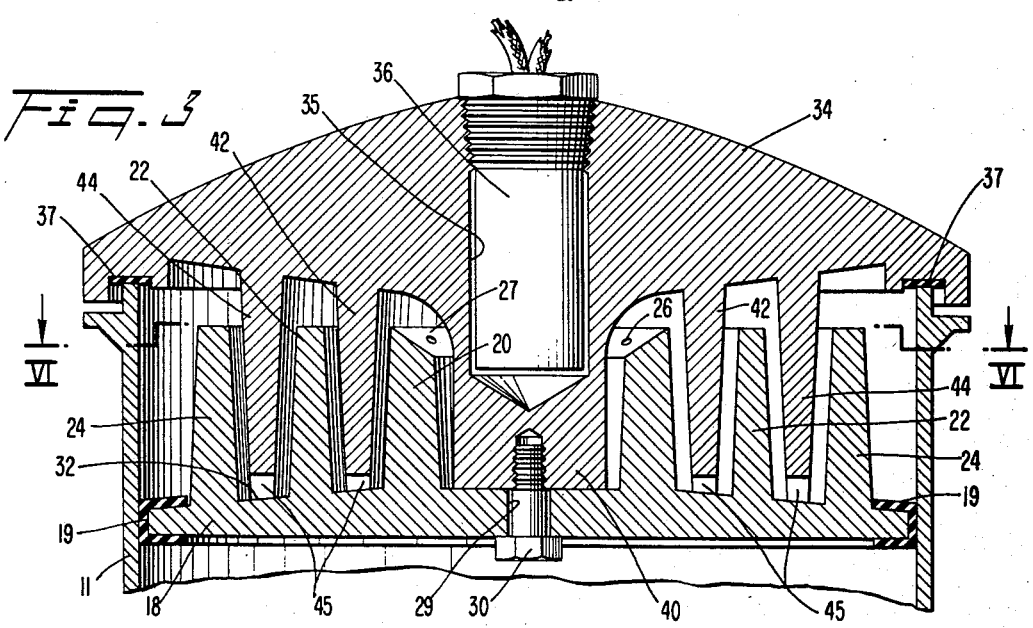
FIG. 3 is a fragmentary sectional view along line III—III of FIG. 2.
Figure 4:
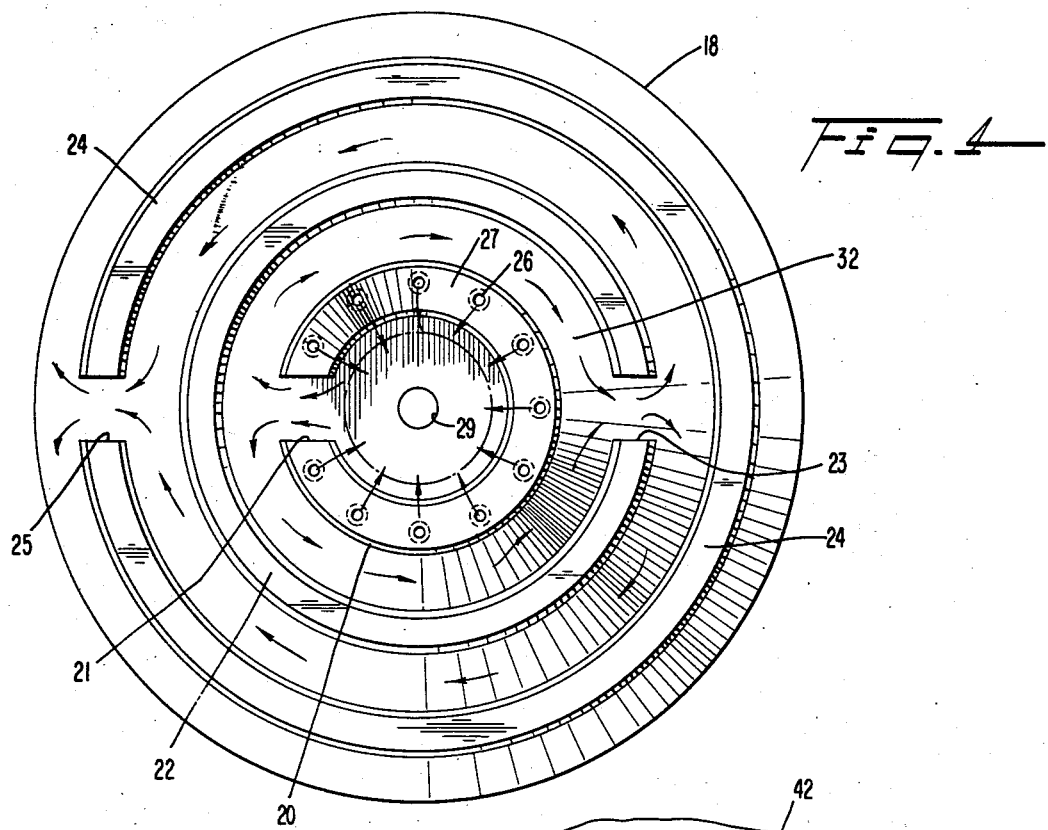
FIG. 4 is a plan view of an evaporator plate made in accordance with this invention.

The reclamation device, generally designated 10, has a housing container 11 having an inlet assembly at the bottom portion thereof and an oil outlet nozzle 14. The oil inlet assembly includes a channel insert element 12 which receives a fitting 16 at one end and a flow nozzle metering element 13 at the other end thereof. The straight bore through element 13 is about 1/32 inch in diameter. The outer end of the insert element 12 is conically shaped to receive the frusto-conical bushing 15 which serves to seal off fluid flow laterally away from the oil inlet opening. All of the oil received is introduced directly into the filter assembly.

The filter assembly is disposed at one end of the housing container 11 and defines a mechanical filtration zone which receives all of the oil coming into the reclamation device 10. The filter assembly includes compressed fibrous filter material 52 contained within a canister 50. Various conventional filter mediums and assemblies may be used in combination with other features of the invention as disclosed with respect to the oil reclamation device 10.

Evaporator plate 18 is disposed within housing 11 adjacent the mechanical filtration zone defined by the filtering mechanism. Plate 18 includes a plurality of upwardly projecting evaporation walls 20, 22, and 24 which define a plurality of curved vaporizing surfaces laterally displaced radially with respect to each other. An upwardly directed vaporizing surface on the innermost annular wall 20 faces inwardly toward the center of the device. A fluid traveling surface 32 is formed between the spaced vaporizing surfaces of walls 20, 22 and 24.

A sealing member 19 having a U-shaped channel cross-section envelopes the outer peripheral edge of plate 18. The resilient annular seal 19 is composed of Buna-N which is an oil resistant rubber. This is an extremely important aspect of the invention since it has been found that in prior art reclamation devices of this type, a considerable amount of the oil to be treated will pass between the inside surface of the housing and the outer peripheral edge of the plate. It is extremely important that all of the oil being treated be brought to the centermost portion of the plate member 18.

The fluid traveling surfaces 32 defined between wall members 20, 22 and 24 are annular. The wall members 20, 22 and 24 have fluid flow openings 21, 23 and 25, respectively, located along the fluid traveling surface 32. Thus, the longest possible traveling time for the oil from the centermost portion of plate 18 to the oil outlet 14 is attained.

The innermost annular evaporation wall member 20 has a single delimited fluid flow opening 21 at a first location. The next adjacent annular evaporation wall member 22 has a single delimited fluid flow opening 23 at a second location on the plate 18, 180° from the first opening 21 at the first location. The size of the fluid flow opening is effective to provide a channeled flow while avoiding build up of oil along surface 32. As further shown in this embodiment, the fluid traveling surface 32 is defined along an incline extending downwardly from the centermost portion of the plate 18 toward the housing container 11.

Passageways 26 extend through plate 18 and deliver substantially all of the oil from the filter zone to a centermost portion of plate 18. Passageways 26 extend from the mechanical filtration zone and open outwardly along the upwardly directed oil introducing surface 27. Oil introducing surface 27 is inclined inwardly with respect to the centermost portion of plate 18 to direct all of the oil in a thin film downwardly over the vaporizing surface toward the longitudinal axis of the device 10.

The heating assembly includes a heat transmitting member 34 disposed at the outer end or open end of housing container 11. Heat transmitting member 34 is disposed adjacent the evaporator plate 18 to define an evaporation chamber therebetween. Heat transmitting member 34 has downwardly projecting heating wall members 40, 42 and 44 which define a plurality of curved heating surfaces located between the curved vaporizing surfaces of evaporator plate 18.

Figure 5:
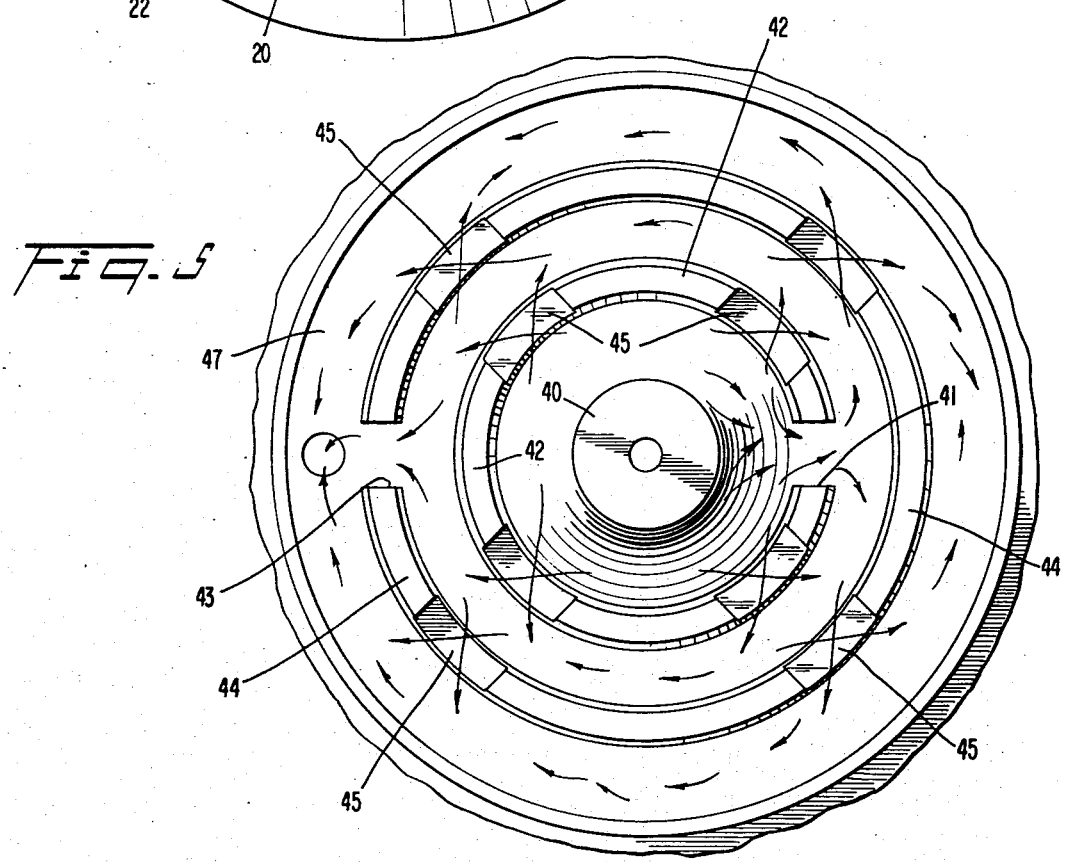
FIG. 5 is a plan view of a heat transmitting element made in accordance with this invention.
Figure 11:
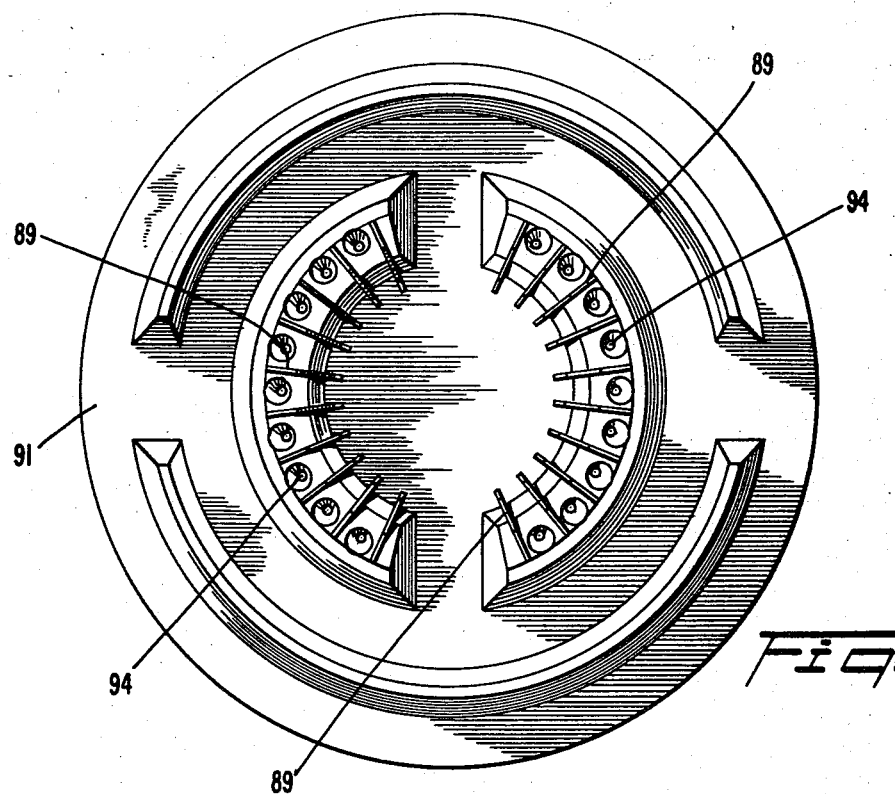
FIG. 11 is a top plan view of the evaporator plate means made in accordance with this invention.
Figure 12:
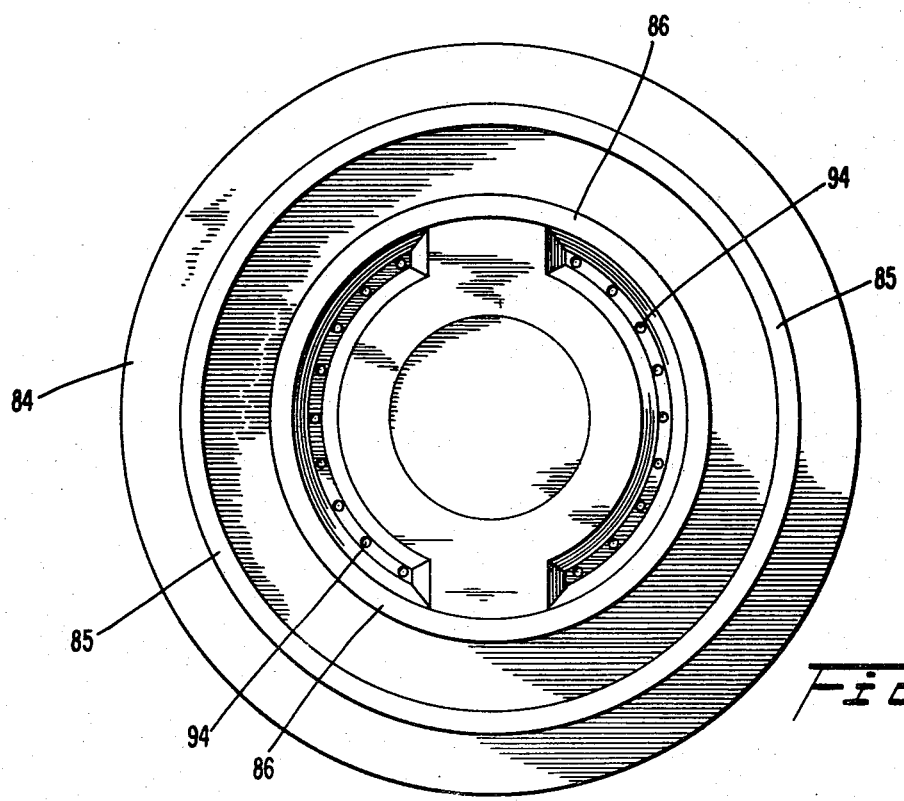
FIG. 12 is a sectional view taken along line XII—XII of FIG. 8.
Figure 13:
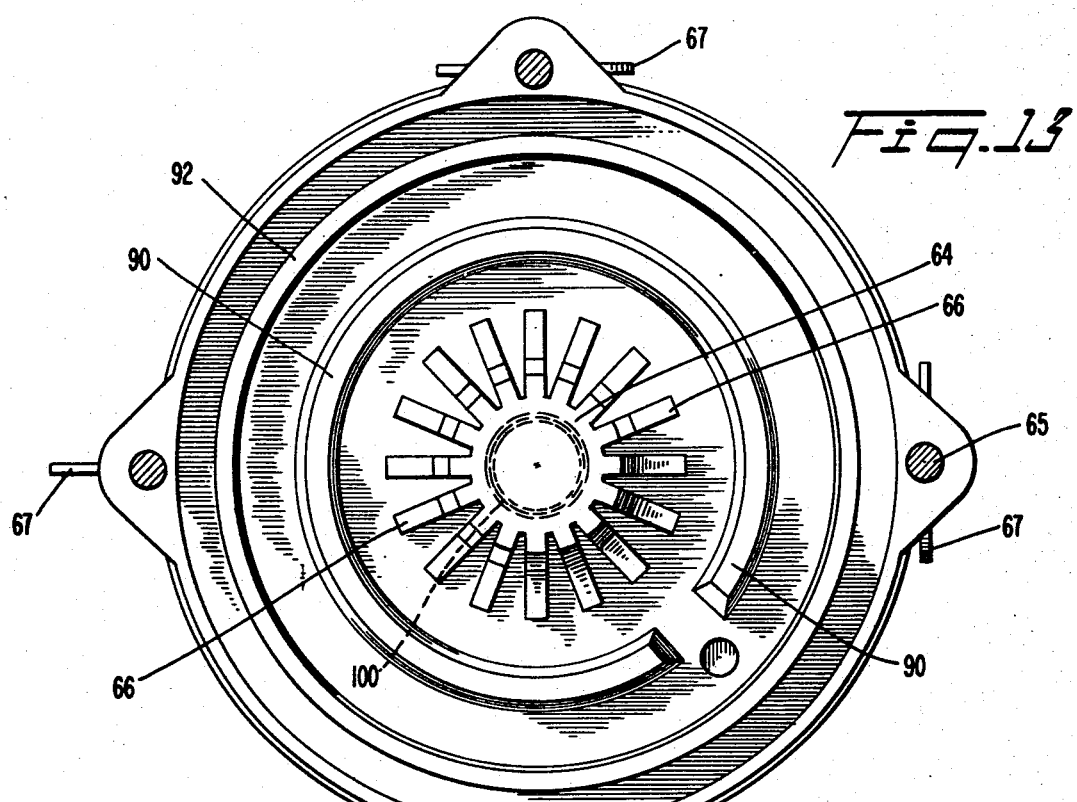
FIG. 13 is a bottom view of the cover means made in accordance with this invention.
Figure 14:
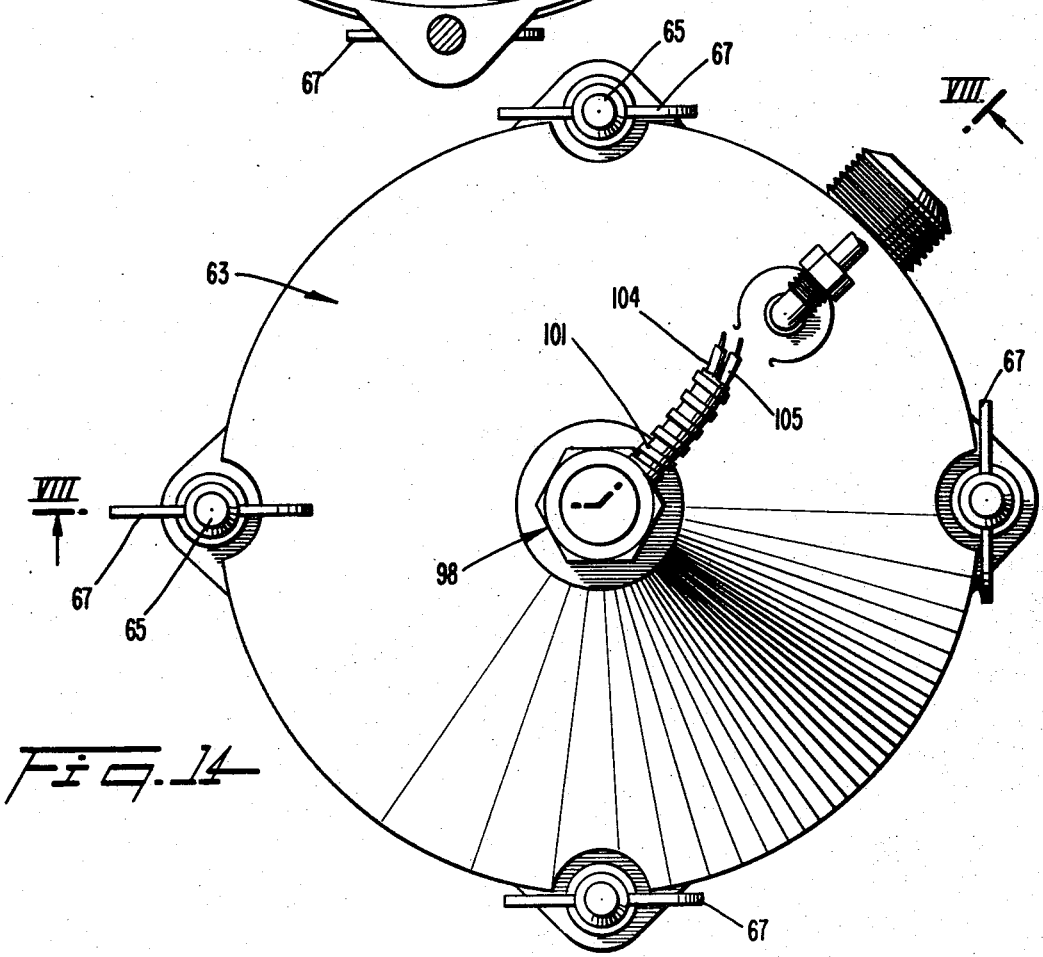
FIG. 14 is a top plan view of the cover means made in accordance with this invention.

When fitted in place, as shown in FIG. 1, the heating wall members 40, 42, and 44 and the evaporation wall members 20, 22 and 24 define a plurality of curved paths along the fluid traveling surface 32 from the longitudinal axis outwardly along the evaporator plate 18. Thus, the evaporator wall means 20, 22 and 24 and the heating wall members 40, 42, and 44 provide a structural configuration effective to guide the oil from the centermost portion of plate 18 outwardly along the curved paths to the oil outlet 14. Fluid flow gates 45 allow the fluid to travel as shown by the arrows in FIGS. 5 and 6.

In this specific embodiment, the heating assembly includes the heat transmitting member 34 with the heating wall members 40, 42 and 44, on one side thereof, and a cavity 35 on the other side to receive the heating element 36. The heating element 36 is connected directly to the battery cable of the vehicle by the electrical leads as shown. A heat conducting fluid is contained in the cavity 35 with the heating element 36. Otherwise, it is virtually impossible to get a suitable surface-to-surface contact between the heating element 36 and inside wall of the cavity 35 for conducting heat through the heat transmitting member 34.

Heat transmitting member 34 defines a closure member for the outer end of the housing container 11. Nut and bolt assemblies 39 are used to interconnect the closure and the container in a well known fashion. An appropriate seal 37 is placed between the butting parts to accomplish the desired sealing results. A vent assembly having a fitting 38 is used to allow vapors to escape from the evaporation chamber during the operation of the device 10.

The heat transmitting centerpost member 40 extends downwardly within the innermost annular evaporation wall member 20. Centerpost member 40 defines a heating surface located adjacent and facing outwardly toward the inwardly facing vaporizing surface of wall member 20. Centerpost member 40 contacts the evaporator plate 18 where it is fixedly attached by bolt 30 projecting through the opening 29 as shown. The remaining heat transmitting walls 42 and 44 are also in contact with the heat fluid traveling surface 32. By this configuration, heat is transmitted via convection and conduction within the evaporation zone.

Heat transmitting member 34 also includes an upper ceiling surface 47 from which the annular walls 42 and 44 extend. Ceiling surface 47 extends along an incline directed upwardly and outwardly from the longitudinal axis of device 10.

Canister 50 has a bottom end portion, a side wall portion, and an upper end portion as shown. It is composed of a material that is impervious to fluids. Canister 50 has a single inlet opening in an indentation 54 specifically fitted over the shaped bushing 15. The oil discharging mechanism is located in the upper end portion of canister 50. A depression 56, in the upper end portion, is effective to make room for the handle 55 and the disposition of the nut 30 immediately above the mechanical filtration zone. Openings 53 located in the upper end portion of canister 50 enable substantially all of the oil to be directed toward the center longitudinal axis of device 10. Handle 55 facilitates the handling of canister 50 into and out of housing 11. A felt pad 51 disposed around the outer periphery of canister 50 helps to control fluid flow and prevent displacement of canister 50 within housing 11.

The oil reclamation device 60 in FIG. 8 has several unique features constituting improvements over the prior art. Cover member 63 is disposed on the upper edge of the container 62 and includes a centerpost 64 having radially extending fin members 66 directed outwardly therefrom. The downwardly extending annular wall 90 prevents the condensation of vaporized material inside the evaporation chamber. All of the vaporized contaminates are forced through the single aperture located adjacent the vapor vent outlet. Annular wall 90 is sufficiently long to prevent the vaporized volatiles from flowing downwardly and through the outlet means back into the engine. Wall 90 is also sufficiently short to maintain the fluid flow of oil down the evaporation wall members of the evaporator plate 91.

Evaporator plate 91 has an upper side with a vaporizing surface 88 disposed upwardly and facing inwardly toward centerpost 64. Oil moves through passageways 94 and flows in a thin film downwardly along vaporizing surface 88 toward the fluid traveling surface located between the radially disposed annular walls as shown. While the oil is in the thin film, the heat transmitted from centerpost 64 and fin members 66 vaporizes the volatile contaminates such as water and fuel which have become entrapped in the lubricating oil during its use.

The lower side evaporator plate 91 includes an annularly disposed outer peripheral seat 84 for receiving a sealing member 83 disposed between evaporator plate 91 and the filter assembly. Sealing member 83 is located along the entire periphery of evaporator plate 91 to prohibit the bypassing of fluids between plate 91 and the inside of container 62. An abutment wall 85 is annularly disposed as a further portion of the outer peripheral seat for fixing the disposition of sealing member 83.

An annular projection 86 is directed downwardly from the lower side of evaporator plate 91 toward the filter assembly. Annular projection 86 is spaced inwardly from the outer periphery of plate 91 and is effective to prevent upward movement of the filter assembly when oil is moving upwardly through the device.

The unique filter assembly of this embodiment includes a canister 68 in which fibrous filter material such as long strand cotton fiber material is compressed under pressure of up to 7000 pounds per square inch. Canister 68 has a bottom end portion 76, a side wall portion 77 and an upper end portion 78. Filter pads 79 and 80 composed of felt or other fibrous material are disposed between the compressed fibrous filter material and the respective end portions 76 and 78. Canister 68 is composed of fluid impervious material and has a single opening in the bottom thereof which fits over the end of the oil inlet assembly 70. Washers 75 composed of rubber material are disposed around the end of the inlet assembly 70 and thereby provide a resilient sealing contact between the inlet opening of canister 68 to receive the entire flow of oil into the device.

Filter canister 68 includes a baffle member 69 disposed at a location intermediate the end portions 76 and 78 to further maintain control of the flow of oil through the filter material. Baffle member 69 is a planar sheet having an outer profile effective to fit inside canister 68 and is further effective to provide a passage of oil from one side of the sheet baffle member 69 to the other side thereof. In this specific embodiment, the outer profile of baffle member 69 is conformed to the cross-sectional shape of the inside of canister 68. The planar sheet member 69 has circumferentially spaced openings disposed along the periphery thereof to allow the passage of oil from one side thereof to the other.

Oil inlet assembly 70 includes a metering element 72 with a circumferential groove through which oil is directed. A bush 73 is used to maintain the position of the element 72 within the inlet fitting 71. Further, elbow 74 is used to connect the inlet assembly to the line directing oil into the device under pressure. The circumferential groove is approximately 1.5 inches long and 1/16 inch in diameter. With this particular configuration, it is possible to establish the same flow rate through device 60 as with the metering device used in the embodiment shown in FIG. 1. Where the earlier embodiment may have had a tendency to clog during operation, this problem has been unexpectedly solved through the use of the larger diameter circumferential bore while maintaining the same flow rate of from about 5 to 6 quarts per hour.

Heating element 98 has an outer heat transmitting casing 100 with a lead wire opening. Lead wires 104 and 105 are connected to electrical resistance unit 102 in casing 100 and extend through the lead wire opening. A flexible protective conduit 103 is connected at the lead wire opening and disposed around lead wires 104 and 105. An epoxy adhesive material 101 cements the protective conduit 103 to casing 100 and further provides a waterproof seal around the opening and completely seals resistance unit 102 within casing 100. Thus, the device may be safely used for marine applications as compared to devices of the prior art. Heating element 98 is disposed within the cavity in cover 63 along with a heat conducting solid particulate material for the purpose of conducting the heat from the element 98 to the centerpost 64 and off the fin members 66. Aluminum articles may be used as the solid heat conducting material.

Container 62 includes an upper peripheral edge section against which cover member 63 is disposed with the downwardly extending flange 92 annularly disposed therealong. Seal 93 is located between the upper peripheral edge section of container 62 and cover member 63. The upper edge section is defined by an outwardly directed and downwardly rolled edge forming a U-shaped groove around container 62. A J-shaped bolt member has a short end section 65 effective to contact the inside of the groove as shown. The wing nut 67 threadingly engages the other end of the J-shaped bolt member and constitutes tightening means for urging the cover member 63 against the upper peripheral edge section of container 62. With this particular configuration of fastening means, cover 63 may be disposed at any location with respect to the upper edge of container 62. This is particularly beneficial where the place of installation is tight and otherwise difficult to manage.

Wing nuts 67 hand tighten cover member 63 downwardly onto the upper peripheral edge of container 62. A surface portion 87 on the inside of cover 63 is in contact with a portion of the upper side of evaporator plate 91. Contact surface portion 87 between centerpost 64 and the upper side of evaporator plate 91 sealingly urges evaporator plate 91 against the top of the filter assembly canister 68 through sealing member 83 as shown. Once the wing nuts 67 are hand tightened, the various parts of the device are firmly in place and the resultant controlled flow of oil through the reclamation device 60 provides the greatest amount of filtration and evaporation of contaminates.

Vaporator plates 106 and 110 are typically used in known prior art devices. Without applicant's invention, these evaporator plates become substantially ineffective when the known device is angularly disposed more than 5° with respect to the vertical. It is essential that any oil heated to evaporate the volatile contaminates also be maintained across the evaporator plate in a thin film. When such angular displacement occurs, all of the oil will rush to one side of the prior art evaporator plates, thereby adversely affecting its vaporization capacity.

Figure 15:
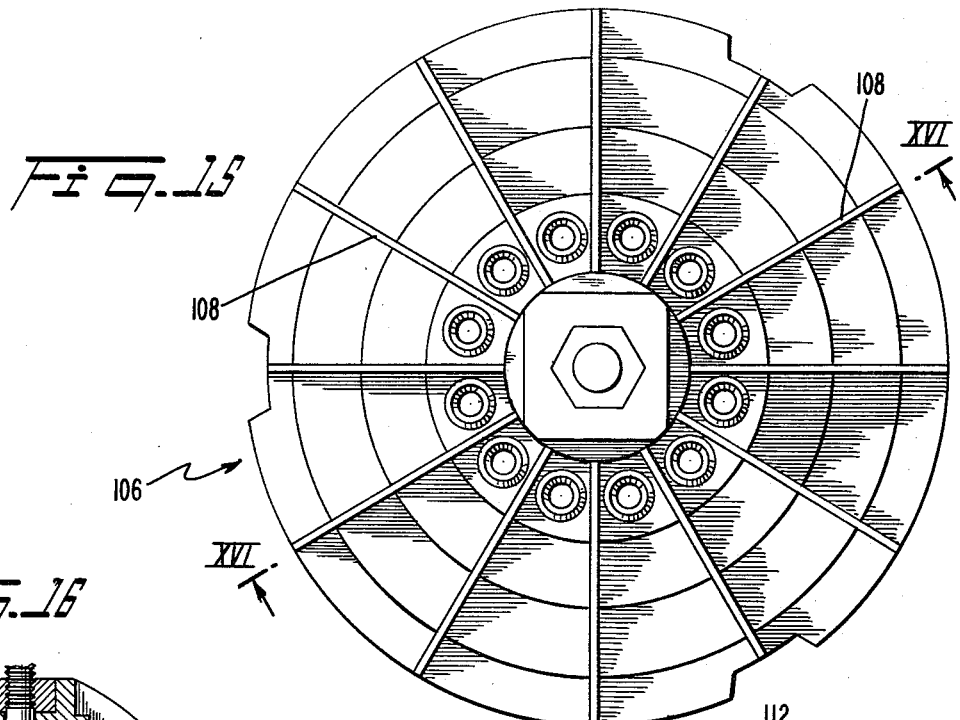
FIG. 15 is a top plan view of an evaporator plate made in accordance with another feature of the invention.
Figure 16:
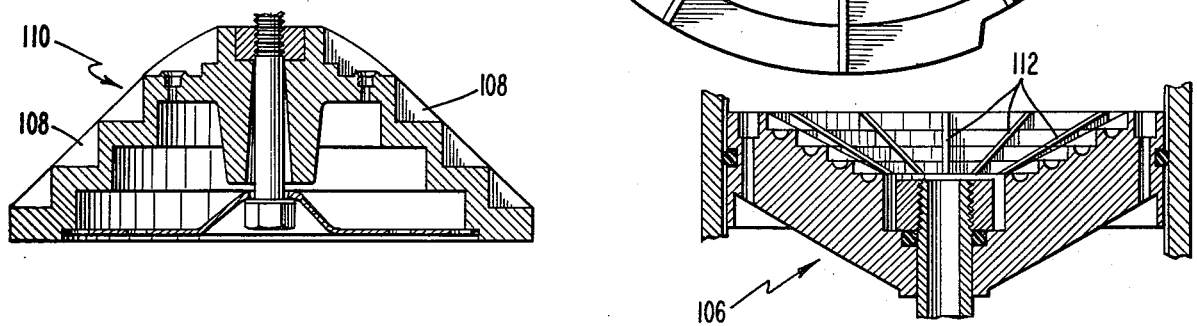
FIG. 16 is a sectional view along line XVI–XVI of FIG. 15.
Figure 18:
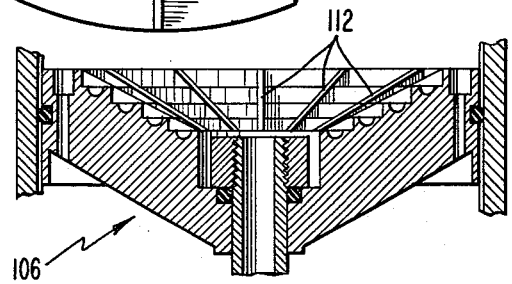
FIG. 18 is a sectional view taken along line XVIII—XVIII.
Figure 17:
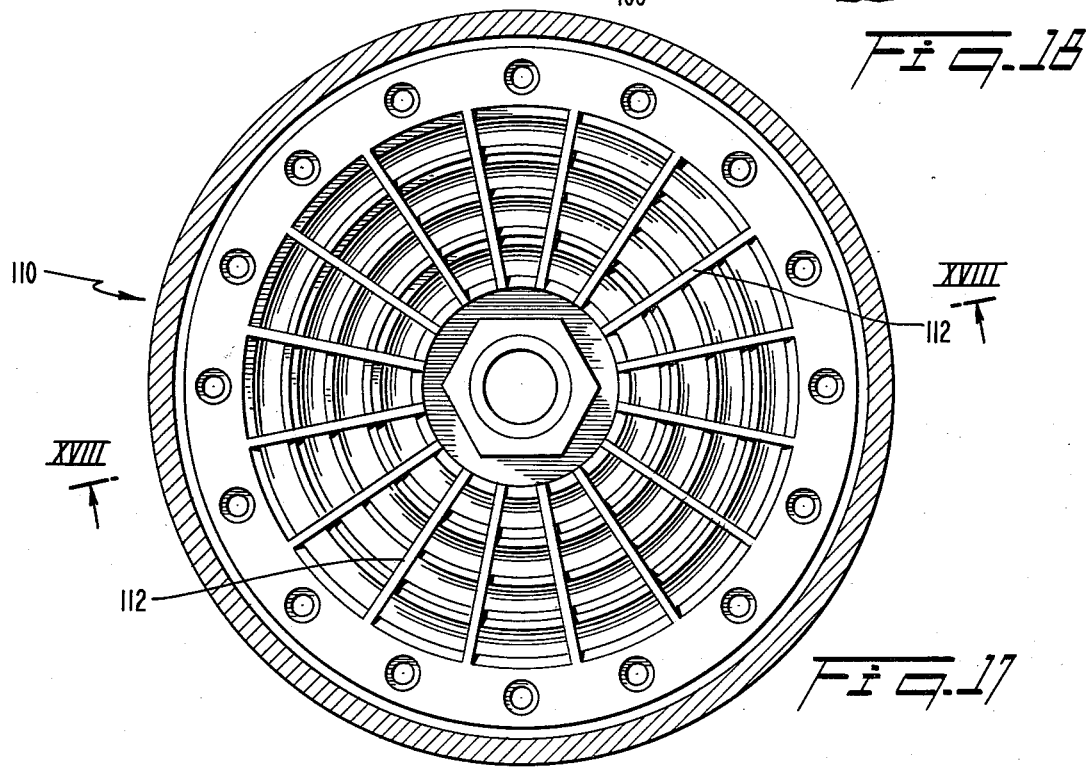
FIG. 17 is a top plan view of another embodiment of an evaporator plate made in accordance with this invention.

It has been unexpectedly discovered that the disposition of wall guide means extending outwardly from the upper side of the evaporator plates 106, 110 and 91 will maintain the direction of movement along the vaporizing surface when the longitudinal axis of the device is angularly disposed with respect to the vertical. A plurality of radially extending wall members 108 and 112 in the embodiments shown in FIGS. 15 and 17 are disposed across the vaporizing surface to form subdivided sections along the vaporizing surface. Wall members 108 maintain the direction of movement of the oil along the vaporizing surface outwardly away from the longitudinal axis of the device. Wall members 112 of evaporator plate 110 maintain the direction of movement of the oil along the vaporizing surface inwardly toward the longitudinal axis of the particular device. In the embodiment of FIG. 8, wall members 89 are located between the openings of passageways 94 and extend inwardly along the oil introducing surface and vaporizing surface 88 to form subdivided sections therealong.

While the oil reclamation device has been shown and described in detail, it is obvious that this invention is not to be considered as being limited to the exact form disclosed, and that changes in detail and construction may be made therein, within the scope of the invention, without departing from the spirit thereof.

I claim:

1. An oil reclamation device having a longitudinal axis and comprising:
   (a) a housing means having a container, a cover means, an oil inlet, an oil outlet means and a vapor removal vent means,
   (b) filter means and evaporator plate means disposed in said container, said filter means including rigid canister means having an upper peripheral edge,
   (c) heating means attached to said cover means,
   (d) said evaporator plate means including an upper and a lower side, said upper side having a vaporizing surface along which oil passes in a thin film and said lower side facing downwardly toward said canister means,
   (e) said cover means including a heat transmitting member and defining an evaporation chamber between the cover means and the evaporator plate means,
   (f) said lower side of the evaporator plate means including an annularly disposed outer peripheral seat for receiving resilient sealing means disposed between the evaporator plate means and the canister means, said sealing means being located along the entire periphery of the evaporator plate means to prohibit bypassing of fluids between the plate means and the container,
   (g) said evaporator plate means including passageway means extending from the filter means to deliver substantially all of the oil being treated into said evaporation chamber in a thin film along the vaporizing surface, and
   (h) fastening means for resiliently securing the cover means to the top of the container against the resilience of the sealing means,
   (i) a portion of the inside of the cover means being in contact with a portion of the upper side of the evaporator plate means to sealingly urge the evaporator plate means against the filter means with said resilient sealing means therebetween.

2. A device as defined in claim 1 wherein said outer peripheral seat is defined by annularly disposed abutment means which projects downwardly from the lower side of the evaporator plate means.

3. A device as defined in claim 1 wherein said lower side of the evaporator plate means includes projection means directed downwardly toward the filter means and laterally spaced inwardly from the outer periphery of said evaporator plate means, said projection means being effective to prevent upward movement of the filter means when oil is moving upwardly through said device.

4. The device as defined in claim 1 wherein said filter means includes compressed fibrous filter material disposed within the canister means, said canister means having a structural configuration to removably fit into the container and receive substantially all of the oil to be treated entering the device through said oil inlet means, the canister means has a bottom end portion, a side wall portion and an upper end portion including said upper peripheral edge disposed against said sealing means, said canister means includes means for receiving oil at the bottom end portion and means for discharging oil from the fibrous filter material at the upper end portion.

5. The device as defined in claim 1 wherein said oil receiving means of the canister means is a single opening disposed around said oil inlet means, said oil discharging means of the canister means includes at least one opening located in said upper end portion, said canister means having a bottom end portion and being composed of a fluid impervious material to provide the only path of oil flow therethrough from the oil receiving means, the fibrous filter material and the oil discharging means, further resilient sealing means is disposed around the single opening of said oil inlet means and between the bottom end portion of the canister means and the container.

6. A device as defined in claim 1 wherein the container includes an upper peripheral edge section and the fastening means contacts said peripheral edge section at one location thereof and said cover member at another location thereof and includes tightening means for urging said cover means against said upper peripheral edge section.

7. A device as defined in claim 6 wherein said upper edge section is defined by an outwardly directed and downwardly rolled upper edge of the container forming a U-shaped groove therearound, said fastening means includes a J-shaped bolt member having a short end section effective to contact said groove.

8. A device as defined in claim 1 wherein said oil inlet means includes an oil inlet assembly having a metering element with a circumferential groove through which oil is directed.

9. A device as defined in claim 1 wherein said upper side of the evaporator plate means includes outwardly projecting wall guide means extending along said vaporizing surface to maintain the direction of movement from said passageways along the vaporizing surface when the longitudinal axis of the device is angularly disposed with respect to the vertical.

10. A device as defined in claim 1 wherein said heat transmitting member includes a centerpost means which extends downwardly toward the evaporator plate means and includes said portion which is in contact with upper side of the evaporator plate means.

11. A device as defined in claim 1 wherein said heat transmitting member included a centerpost member which extends downwardly to contact said evaporator plate means and includes a plurality of fin members outwardly directed from said longitudinal axis toward the vaporizing surface.

12. A device as defined in claim 1 wherein said heating means includes a heating element having an outer heat transmitting casing having a lead wire opening, an electrical resistance unit disposed within said casing, electrical lead wires connected to said electrical resistance unit and extending through said lead wire opening, and a flexible protective conduit connected to said casing at said lead wire opening and disposed around said lead wires, said cover means includes a cavity in said centerpost means on the side opposite said heating surface to receive said heating element.

13. A device as defined in claim 12 wherein the heating means includes a heat conducting solid particulate material contained in the cavity with the heating element.

14. A device as defined in claim 12 wherein an epoxy adhesive material cements the protective conduit to said casing and seals said resistance unit within said casing.

15. An oil reclamation device having a longitudinal axis and comprising:

(a) a housing means having a container, a cover means, an oil inlet, an oil outlet means and a vapor removal vent means, (b) filter means and evaporator plate means disposed in said container, (c) heating means attached to said cover means, (d) said evaporator plate means including an upper and a lower side, said upper side having a vaporizing surface along which oil passes in a thin film and said lower side facing downwardly toward said filter means, (e) said cover means including a heat transmitting member and defining an evaporation chamber between the cover means and the evaporator plate means, (f) said evaporator plate means including passageway means extending from the filter means and opening onto said upper side of the evaporator plate means to deliver oil into said evaporation chamber in a thin film along the vaporizing surfaces, (g) said upper side of the evaporator plate means including outwardly projecting wall guide means extending along said vaporizing surface to maintain the direction of movement from said passageways along the vaporizing surface when the longitudinal axis of the device is angularly disposed with respect to the vertical, and (h) fastening means for securing the cover means to the top of the container.

16. A device as defined in claim 15 wherein said wall guide means includes a plurality of radially extending wall members disposed across the vaporizing surface to form subdivided sections along said vaporizing surface.

17. A device as defined in claim 15 wherein the passageway means open onto the outer peripheral portions of the evaporator plate means, and the wall guide means maintain the direction of movement of the oil along the vaporizing surface inwardly toward said longitudinal axis.

18. A device as defined in claim 15 wherein the passageway means open onto the inner center portions of the evaporator plate means, and the wall guide means maintain the direction of movement of the oil along the vaporizing surface outwardly away from said longitudinal axis.

19. A device as defined in claim 15 wherein an innermost annular evaporation wall member is located on said upper side and includes said vaporizing surface which is upwardly disposed and faces inwardly and an upwardly directed oil introducing surface, said passageway means extend from the filter means and include a plurality of separate passageway openings which open outwardly along the oil introducing surface which is inclined inwardly toward said longitudinal axis to direct the oil being treated toward said longitudinal axis, and said wall guide means includes a plurality of radially extending wall members located between said passageway openings and extend inwardly along the oil introducing surface and the vaporizing surface to form subdivided sections therealong.

20. An oil reclamation device having a longitudinal axis and comprising:

(a) a housing means having a container, a cover means, an oil inlet, an oil outlet means and a vapor removal vent means, (b) filter means and evaporator plate means disposed in said container, and (c) heating means attached to said cover means, (d) said evaporator plate means including upwardly projecting evaporation wall means defining a fluid traveling surface and an upwardly disposed vaporizing surface facing inwardly toward the longitudinal axis, (e) said cover means including downwardly projecting centerpost means defining a heat transmitting member having a heating surface located adjacent the vaporizing surface and forming an evaporation chamber between the cover means and the evaporation plate means, (f) said centerpost means including a plurality of fin members outwardly directed from said longitudinal axis toward the vaporizing surface, (g) said evaporator plate means including passageway means extending from the filter means to deliver substantially all of the oil being treated into said evaporation chamber, (h) said passageways open inwardly toward the longitudinal axis and are effective to deliver said oil in a thin film along the vaporizing surface, (i) said fluid traveling surface having a structural configuration effective to guide the oil from said centerpost means outwardly to said oil outlet means.

21. A device as defined in claim 20 wherein cover means includes a vent opening and a downwardly projecting wall having an aperture adjacent said vent opening to direct flow of vaporized contaminates and prevent condensation thereof.

22. An oil reclamation device having a longitudinal axis and comprising:

(a) a housing means having a container, a cover means, an oil inlet, an oil outlet means and a vapor removal vent means, (b) filter means and evaporator plate means disposed in said container, (c) heating means attached to said cover means, (d) said evaporator plate means including an upper and a lower side, said upper side having a vaporizing surface along which oil passes in a thin film and said lower side facing downwardly toward said filter means, (e) said cover means including a heat transmitting member and defining an evaporation chamber between the cover means and the evaporator plate means, (f) said evaporator plate means including passageway means extending from the filter means and opening onto said upper side of the evaporator plate means to deliver oil into said evaporation chamber in a thin film along the vaporizing surface, (g) said oil inlet means including an oil inlet assembly having a metering element to control the rate of oil flow into said container, (h) said metering element having a circumferential groove through which said oil is directed, (i) fastening means for securing the cover means to the top of the container.

23. In an oil reclamation device having a housing means, filter means, evaporator plate means, heating means, the combination comprising:

(a) filter means including compressed fibrous material disposed within a canister means and sealing means disposed outside the canister means, (b) said canister means having a structural configuration to removably fit into the housing means which includes an oil inlet means, (c) the canister means being composed of a rigid oil impervious material and having a bottom end portion, a side wall portion and an upper end portion, (d) said canister means includes a single opening with sealing means disposed around said oil inlet means for receiving all oil at the bottom end portion and further includes an opening for discharging oil from the fibrous filter material with sealing means disposed around said opening at the upper end portion of the canister means between said canister means and said evaporator plate means, (e) said fibrous material being continuous throughout the cross-section of said canister means, (f) said canister means with said sealing means being effective to provide the only path of oil flow therethrough from the oil inlet means, the fibrous filter material and the opening in said upper end portion thereof.

24. An assembly as defined in claim 23 wherein said filter means includes a baffle means disposed in said canister means at a location intermediate said end portions to direct the flow of oil through the filter material.

25. An assembly as defined in claim 24 wherein said baffle means includes a planar sheet member having an outer profile effective to fit inside the canister means and further effective to provide a passage of oil from one side of the sheet member to the other side thereof.

26. An assembly as defined in claim 25 wherein said outer profile of the baffle means is conformed to the cross-sectional shape of the canister means, and the planar sheet member has openings therethrough to allow the passage of oil from one side of the baffle means to the other.

27. An assembly as defined in claim 26 wherein said openings are circumferentially spaced with respect to each other along the periphery of the sheet member.

28. A filter assembly for use in a filter zone of an oil reclamation device having a housing means with an oil inlet means and an oil outlet means, and an evaporator plate means disposed above the filter zone in said housing means, said assembly comprising:

(a) filter means having a structural configuration to fit in said filter zone and including sealing means and fibrous filter material, said filter material being disposed within and having a continuous cross-section throughout a canister means, (b) said canister means having a structural configuration to removably fit into the housing means and receive substantially all of the oil to be treated entering the device through said oil inlet means, (c) the canister means being composed of a rigid oil impervious material and having a bottom end portion, a side wall portion and an upper end portion, (d) said canister means includes a single opening for receiving all oil at the bottom end portion from said oil inlet means and further includes an opening located in the centermost area of said upper end portion for discharging oil from the fibrous filter material at the upper end portion, (e) said sealing means including a bottom sealing member and a top sealing member, (f) said bottom sealing member having a structural configuration to fit around said oil inlet means between the canister means and the housing means, (g) said top sealing member having a structural configuration to fit around said opening in the upper end portion of the canister means between said canister means and said evaporator plate means, (h) said canister means with said sealing means being effective to provide the only path of oil flow therethrough from the single opening of the bottom end portion, through the fibrous filter material and upwardly out of said opening of the upper end portion.

* * * * *